United States Patent [19]
Kato et al.

[11] Patent Number: 5,801,705
[45] Date of Patent: Sep. 1, 1998

[54] GRAPHIC DISPLAY UNIT FOR IMPLEMENTING MULTIPLE FRAME BUFFER STEREOSCOPIC OR BLINKING DISPLAY, WITH INDEPENDENT MULTIPLE WINDOWS OR BLINKING REGIONS

[75] Inventors: Yoshiyuki Kato; Masatoshi Kameyama; Takahiro Miki, all of Tokyo, Japan

[73] Assignee: Mitsudishi Denki Kabushiki Kaisha, Tokyo, Japan

[21] Appl. No.: 672,417

[22] Filed: Jun. 28, 1996

[30] Foreign Application Priority Data

Nov. 14, 1995 [JP] Japan ................... 7-295525

[51] Int. Cl.⁶ ........................... G06T 15/00
[52] U.S. Cl. ........................... 345/419
[58] Field of Search ............... 395/119–124; 345/419–424; 348/43

[56] References Cited

U.S. PATENT DOCUMENTS

| | | | |
|---|---|---|---|
| 4,703,317 | 10/1987 | Shiomi et al. | 340/723 |
| 4,719,507 | 1/1988 | Bos | 358/92 |
| 4,724,431 | 2/1988 | Holtey et al. | 340/703 |
| 4,851,901 | 7/1989 | Iwasaki | 358/88 |
| 5,502,462 | 3/1996 | Mical et al. | 345/185 |

FOREIGN PATENT DOCUMENTS

| | | |
|---|---|---|
| 0328357 | 8/1989 | European Pat. Off. . |
| 0502511 | 9/1992 | European Pat. Off. . |

OTHER PUBLICATIONS

Computer Graphics:Prinicples and Practice; (Addisoon-Wesley), pp. 915–916.

*Primary Examiner*—Almis R. Jankus
*Attorney, Agent, or Firm*—Wolf, Greenfield & Sacks, P.C.

[57] ABSTRACT

A graphic display unit makes it possible for a stereo display or blink operation to be implemented on a window system with each window having an arbitrary contour, and on a window by window basis. The graphic display unit of this invention comprises a frame buffer for a right eye, a frame buffer for a left eye, a window-id buffer which stores a window-id corresponding to the contour and position of windows on the frame buffer, a look-up table which stores control information related to stereo display and is accessed based on a window-id, a frame counter that issues the timing of switching frame buffers, a stereo display control circuit for switching buffers based on signals from both the look-up table and from the frame counter, and stereo viewer that controls shutters for a right eye and a left eye.

18 Claims, 7 Drawing Sheets

GRAPHIC DISPLAY UNIT FOR IMPLEMENTING MULTIPLE FRAME BUFFER STEREOSCOPIC OR BLINKING DISPLAY, WITH INDEPENDENT MULTIPLE WINDOWS OR BLINKING REGIONS

BACKGROUND OF THE INVENTION

1. Field of the Invention

The present invention relates generally to a graphic display unit, and more particularly to a graphic display unit which performs stereo display at the arbitrary shapes of windows on a CRT by switching two kinds of image data suitable for a right eye and for a left eye alternatively synchronized with a shutter on the stereo viewer. Also, this invention relates to a graphic display unit which implements blink operation at the arbitrary contour of windows on a CRT by alternately switching two kinds of data for background and for blink color.

2. Description of Related Art

A stereo display unit relates to a whole screen on a CRT as an object for performing stereo display.

FIG. 7 is a block diagram of a stereo display unit, for the implementation of a conventional method. In the diagram, 700 is a frame buffer that stores image data for a right eye, and 701 is a frame buffer for a left eye.

702 is a stereo display control circuit that controls image data issued from the frame buffers for a right eye and for a left eye respectively. 703 is a RAMDAC for transforming a digital signal to an analog signal. 704 is a CRT unit, and 705 is a stereo viewer for controlling shutters for a right eye and a left eye based on the signal outputted from the circuit 702.

The operation of the above configuration will be described hereinbelow.

There is stored three-dimensional image data for a right eye in a frame buffer 700. Likewise, in the frame buffer for a left eye 701, there is stored three-dimensional image data for a left eye.

The stereo display control circuit 702 performs a switching operations between the image data issued from a right frame buffer and a left frame buffer synchronized with the timing of the frame buffers. Image data as is issued from stereo display control circuit 702 is changed into analog signal by RAMDAC 703 to be displayed on the CRT unit 704.

Since the stereo display unit is constructed set forth above, the whole screen associated with buffers for a right eye and a left eye must be switched to achieve stereo display. Accordingly this makes it impossible to implement stereo display on a window-by-window basis, and to achieve the stereo display on a window with an arbitrary contour.

Moreover, this results in a problem with adjustments of a window system.

Also, another plane concentrated on blink operation is required in order to implement different kinds of blink periodicity. This results in a large-scale hardware implementation.

SUMMARY OF THE INVENTION

It is therefore an object of the present invention to overcome the above deficiencies involved in the prior art and to provide a graphic display unit capable of implementing stereo display on a window by window basis, and capable of blink operation with ease.

According to a first aspect of the present invention, in order to accomplish the above object, there is provided a graphic display unit for implementing stereo display through a stereo viewer comprising a frame buffer for storing image data suitable for a right eye; a frame buffer for storing image data suitable for a left eye; means for storing window control information which specifies properties for stereo display in accordance with each window region; stereo display circuit which performs switching operation between the frame buffers for a right eye and a left eye, and which controls shutter operation for a stereo viewer synchronized with the switching operation, based on the window control information.

Under the above configuration, corresponding to the contour of the window located on the frame buffers for each eye, there is stored the properties related to stereo display. And the stereo display control circuit switches the buffers and performs shutter-control on the stereo viewer based on both the properties and a toggled-signal. Accordingly this makes it possible for stereo display to be implemented on a window-by-window basis.

According to a second aspect of the present invention, in order to achieve the above object, there is provided a graphic display unit for implementing stereo display through a stereo viewer comprising first and second frame buffers for storing image data suitable for a right eye; first and second frame buffers for storing image data suitable for a left eye; means for storing window control information which specifies properties for stereo display in accordance with each window region; stereo display circuit which performs switching operation between said first and second frame buffers for a right eye and said first and second frame buffers for a left eye, and which controls shutter operation for a stereo viewer synchronized with the switching operation, based on the window control information.

Under the above configuration, the buffers for each eye are constructed as double-buffered configuration, and the frame buffer used for display and drawing operation is always different. Thus, by exchanging both the buffers for these operations after the drawing operation is over, stereo display for animation is implemented.

According to a third aspect of the present invention, in order to attain the above object, there is provided a graphic display unit for implementing blink operation comprising a first frame buffer for storing image data; a second frame buffer for storing color information in blinking; means for storing blink control information which specifies properties for blink operation in accordance with each window region; a blink control means which performs switching operation between the first frame buffer and the second frame buffer, based on the blink control information.

Under the above configuration, corresponding to the contour of the window located on the frame buffers, there is stored the properties related to blink operation. The blink control circuit switches the buffers based on both the properties and a toggled-signal. Accordingly this makes it possible for blink operation to be implemented on a window-by-window basis.

According to a fourth aspect of the invention, there is provided a graphic display unit wherein a storing means includes a look-up-table for storing information related to stereo display which can be different in accordance with each window; and a window-id buffer that stores information specifying an index to the look-up-table onto the region corresponding to the window at the frame buffer.

Under the above configuration, corresponding to the contour of the window located on the frame buffers for each eye, there is stored a window-id on the window-id buffer.

The stereo display control circuit switches the buffers and performs shutter-control on the stereo viewer based on both the properties related to stereo display stored on the look-up table and a toggled-signal. Accordingly this makes it possible for stereo display to be implemented on a window-by-window basis.

According to a fifth aspect of the invention, there is provided a graphic display unit wherein a storing means includes a look-up-table for storing information related to stereo display, which is used to control the first and second frame buffer configured to be double-buffered for each eye, in accordance with each window; and window-id buffer that stores information specifying an index to the look-up-table onto the region corresponding to the window at the frame buffer.

Under the above configuration, corresponding to the contour of the window located on the double-buffered frame for each eye, there is stored an index to the look-up table on the window buffer. When exchanging these buffers for the purpose of display and drawing operation, it is done just as the index on the window buffer points to the entry of the look-up table concerned with the properties.

In this way, the stereo display control circuit makes it possible for stereo display for animation to be implemented on a window-by-window basis.

According to a sixth aspect of the invention, there is provided a graphic display unit wherein a storing means includes a look-up-table for storing blink information in which the period can be different on a window by window basis; and a window-id buffer that stores information specifying an index to the look-up-table onto the region corresponding to the window at the frame buffer.

Under the above configuration, corresponding to the contour of the window located on the frame buffer, there is stored an index to the look-up table on the window buffer. The blink control circuit performs a switching operation on these buffers based on blink control information and a toggled-signal.

In this way, the blink control circuit makes it possible for different kinds of blink operation to be done on the each region on the screen.

DESCRIPTION OF THE PREFERRED EMBODIMENTS

The present invention will now be described in more detail relative to non-limitative embodiments and with regard to the accompanying drawings.

Embodiment 1

The embodiment 1 of the present invention will be described with regard to FIG. 1 and FIG. 2.

Figure 1:
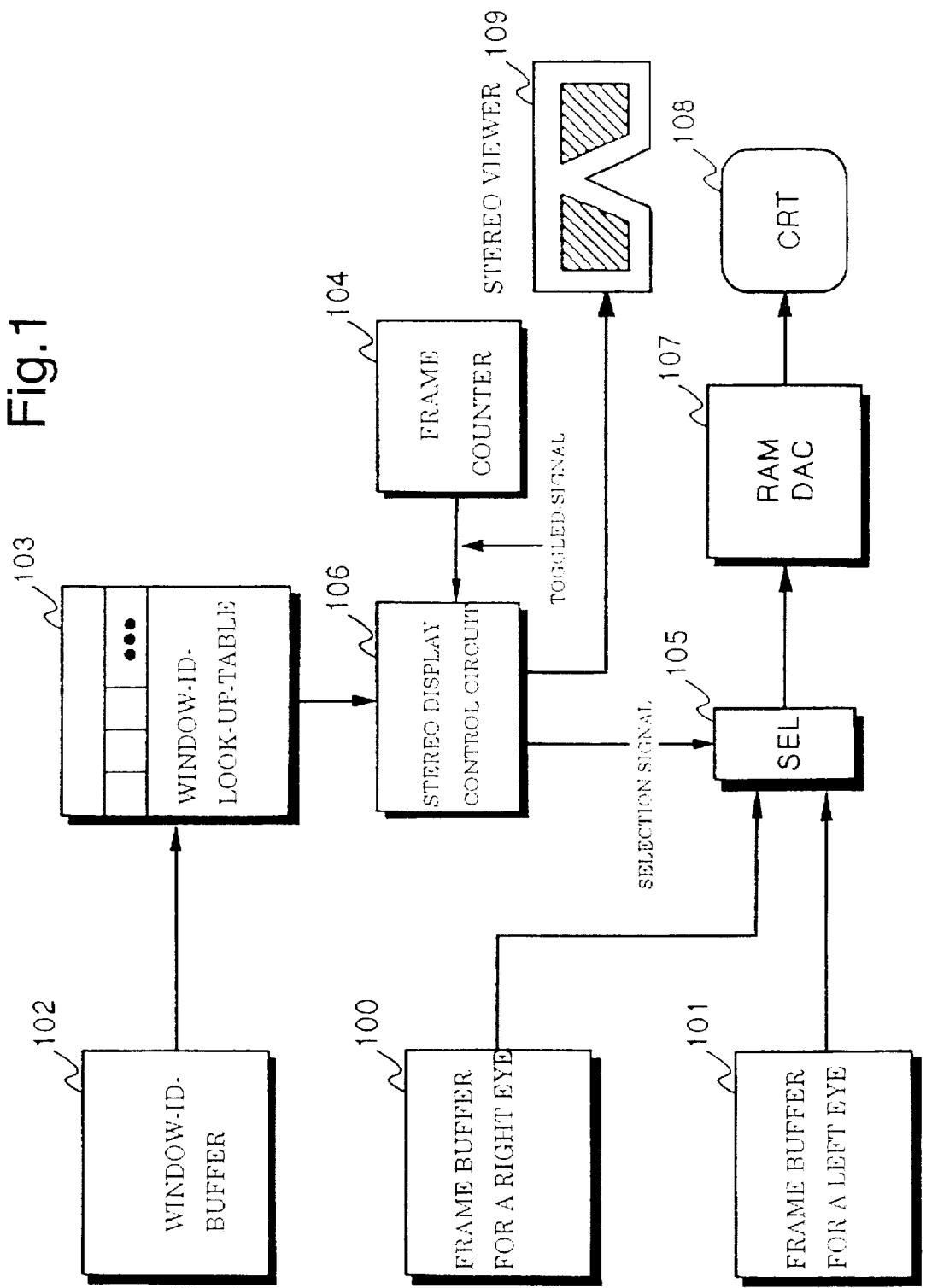
FIG. 1 is a block diagram of a stereo display unit according to a first embodiment of the present invention.
Figure 2:
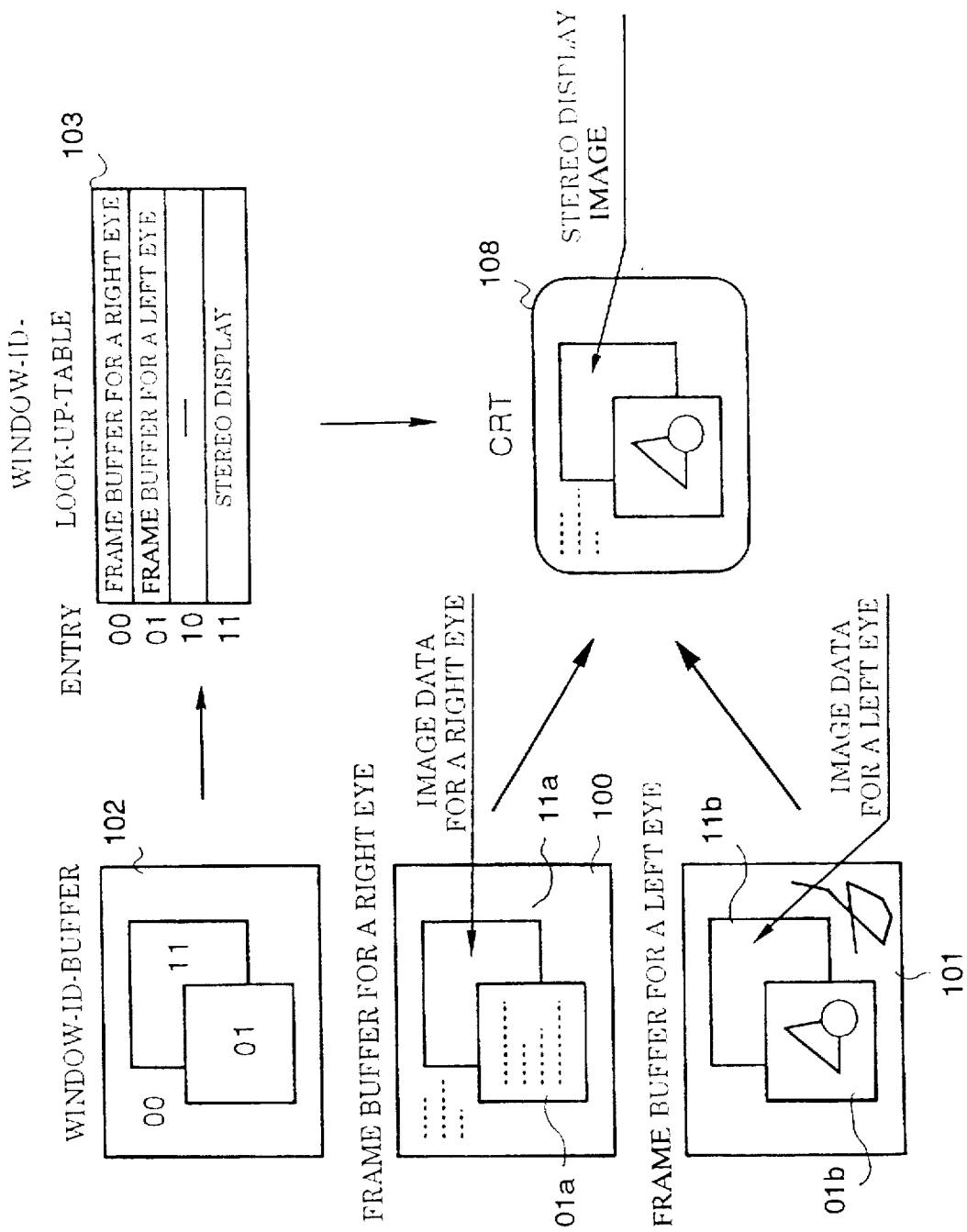
FIG. 2 is a explanatory diagram of a FIG. 1, showing the relations between a W-ID-BUF, a frame buffer for a right eye, a frame buffer for a left eye, and a screen on a CRT.

The FIG. 1 is a block diagram that illustrates a configuration of a graphic display unit related to a first embodiment, and FIG. 2 is a drawing that shows relations between a Window -Id-Buffer, frame buffers for a right eye and for a left eye and a screen on the CRT unit.

As shown in FIG. 1, reference numeral 100 is a frame buffer used for a right eye, where image data available for a right eye is stored. 101 is a frame buffer used for a left eye, where image data available for a left eye is stored.

102 is a Window-Id-Buffer (referred to as "W-ID-BUF" hereinafter), in which Window-ID(referred to as "W-ID" hereinafter) is stored in accordance with the contour of the WINDOW so as to designate some properties for stereo display stored in a Window Id-Look-Up-Table on a pixel unit basis.

103 is a Window-Id-Look-Up-Table (referred to as "W-ID-LUT" hereinafter), which transforms a signal for selecting a frame buffer so as to implement a stereo display based on information issued from the W-ID-BUF 102.

104 is a frame counter which counts the number of frames and issues a toggled-signal that specifies the timing of changing the frame buffers alternately.

105 is a selector circuit that selects the image data issued from frame buffers for a right eye 100 and for a left eye 101.

106 is a stereo display control circuit, which outputs signals used for switching a selector circuit 105 and a stereo viewer 109 based on both output-data from W-ID-LUT 103 and a signal from the frame counter 104.

107 is a RAMDAC that transforms from digital data to analog data, and 108 is a CRT unit.

109 is a stereo viewer which controls shutters for a right eye and a left eye, based on signals issued from a stereo display control circuit 106.

FIG. 2 illustrates that image data for a right eye 11a and image data for a left eye 11b are stored in frame buffers 100 and 101, respectively, in accordance with W-ID "11" in a W-ID-BUF 102, and also image data for right eye 01a and for a left eye 01b are stored in the frame buffers 01 in compliance with W-ID "01" respectively.

Further, the W-ID-LUT 103 specifies a right eye frame buffer as stereo display control information related to W-ID "00" and specifies a left eye frame buffer as W-ID "01".

In addition, it requires that stereo display control for W-ID "11" be done by using both a right eye frame buffer and a left eye frame buffer.

A description will now be given of the operation.

It is assumed that three-dimensional image data suitable for a right eye will be stored in a right eye frame buffer 100, and three-dimensional image data suitable for a left eye will be stored in a left eye frame buffer 101 in advance.

The selector circuit 105 decides which image data, from a right-eye frame buffer 100 or from a left eye frame buffer 101, should be selected. The image data selected by a selector circuit 105 is transformed to analog RGB signals and is displayed on the CRT 108.

The next explanation is as to how the selector circuit 105 selects the right eye image data and the left eye image data respectively.

The W-ID information that specifies the stereo display information in a W-ID-LUT 103, which correspond to the window region of performing stereo display, is stored in a W-ID-BUF 102.

Accordingly, this enables the region of stereo display to be designated on a pixel unit basis.

And the W-ID value issued from W-ID-BUF 102 is used as a index value to the W-ID-LUT 103, and W-ID-LUT information is outputted to a stereo display control circuit 106 so as to control the frame buffers.

As shown in FIG. 2, in case that the table value in a W-ID-LUT 103 is control information either for "a right eye frame buffer" or "a left eye frame buffer", then a stereo display control circuit 106 sends signals to the selector circuit 105 so that image data from the frame buffer for right eye 100 or the frame buffer for a left eye 101 can be selected constantly.

On the other hand, in case that the table value in a W-ID-LUT 103 is "stereo display", then the stereo display control circuit 106 sends a signal for controlling a right frame buffer 100 to a selector circuit 105 only when a toggled-signal issued from the frame counter 104 is "0". Likewise, while a toggled-signal is "1", the stereo display control circuit 106 sends a signal for selecting a left frame buffer 101 to a selector circuit 105.

By the way, a frame counter 104 is a programmable counter that counts up based on a vertical synchronous signal (VSC), and sends the toggled-signal synchronized with VSC to a stereo display control circuit 106. A switching operation of the toggled-signal is performed during a vertical blanking period.

Further, while a stereo display control circuit 106 selects image data from a right frame buffer 100, it closes a left eye shutter of a stereo viewer 109, and in selecting image data from a left eye frame buffer, it closes a right eye shutter of a stereo viewer.

On the other hand, except when a table value of W-ID-LUT is "stereo display", both of the shutters of a stereo viewer 109 are open.

On the image data to be stereo display, this enables the image data to be seen through a right eye in case that image data on the right eye frame buffer 100 is displayed on the CRT. When image data on the left eye frame buffer is displayed on the CRT, then this enables the image data to be seen through a left eye. In this way, display is accomplished.

Embodiment 2

A second embodiment of the present invention will be described in the following with regard to FIG. 3 and FIG. 4.

Figure 3:
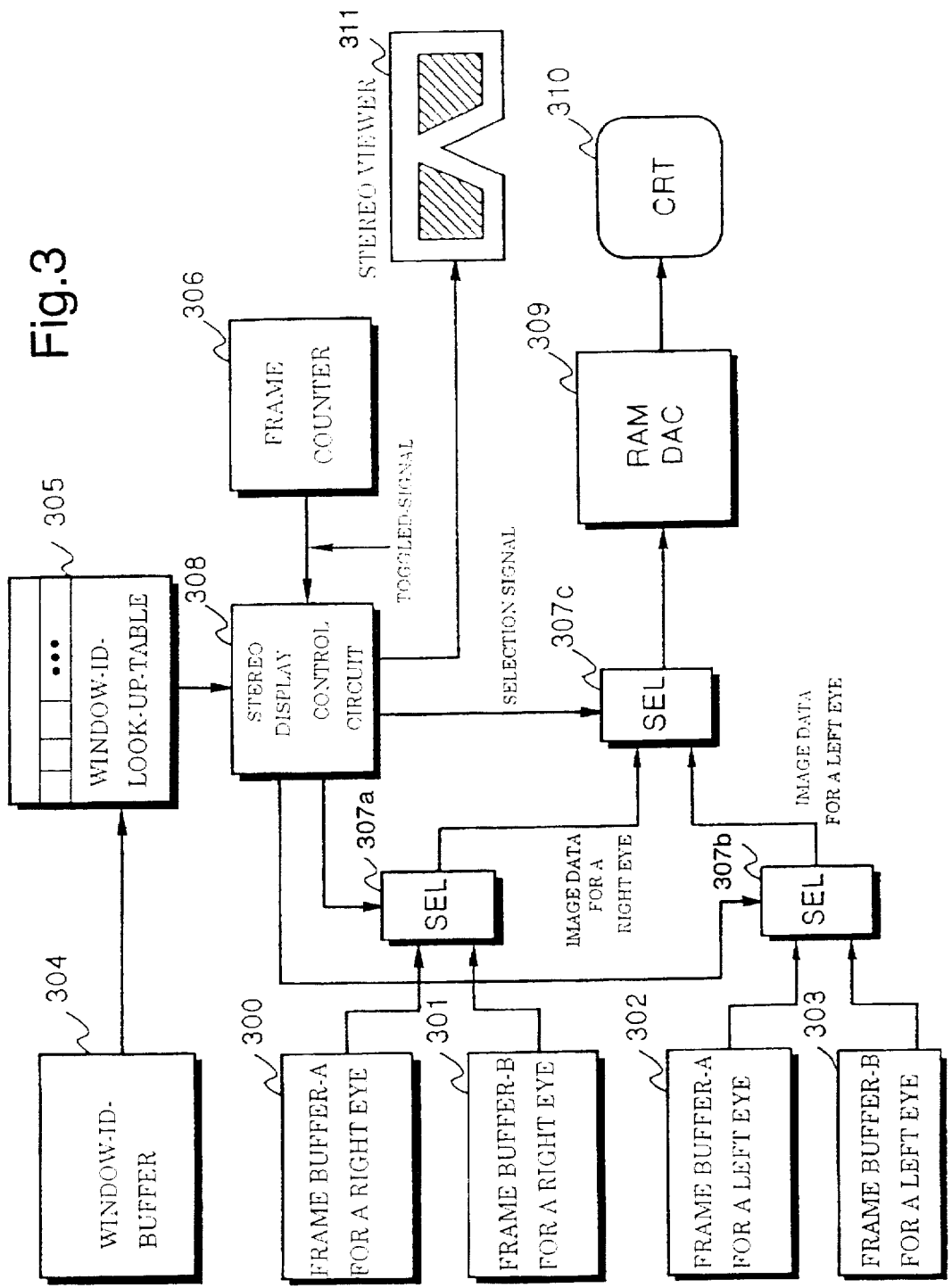
FIG. 3 is a block diagram of a stereo display unit according to a second embodiment of the present invention.
Figure 4:
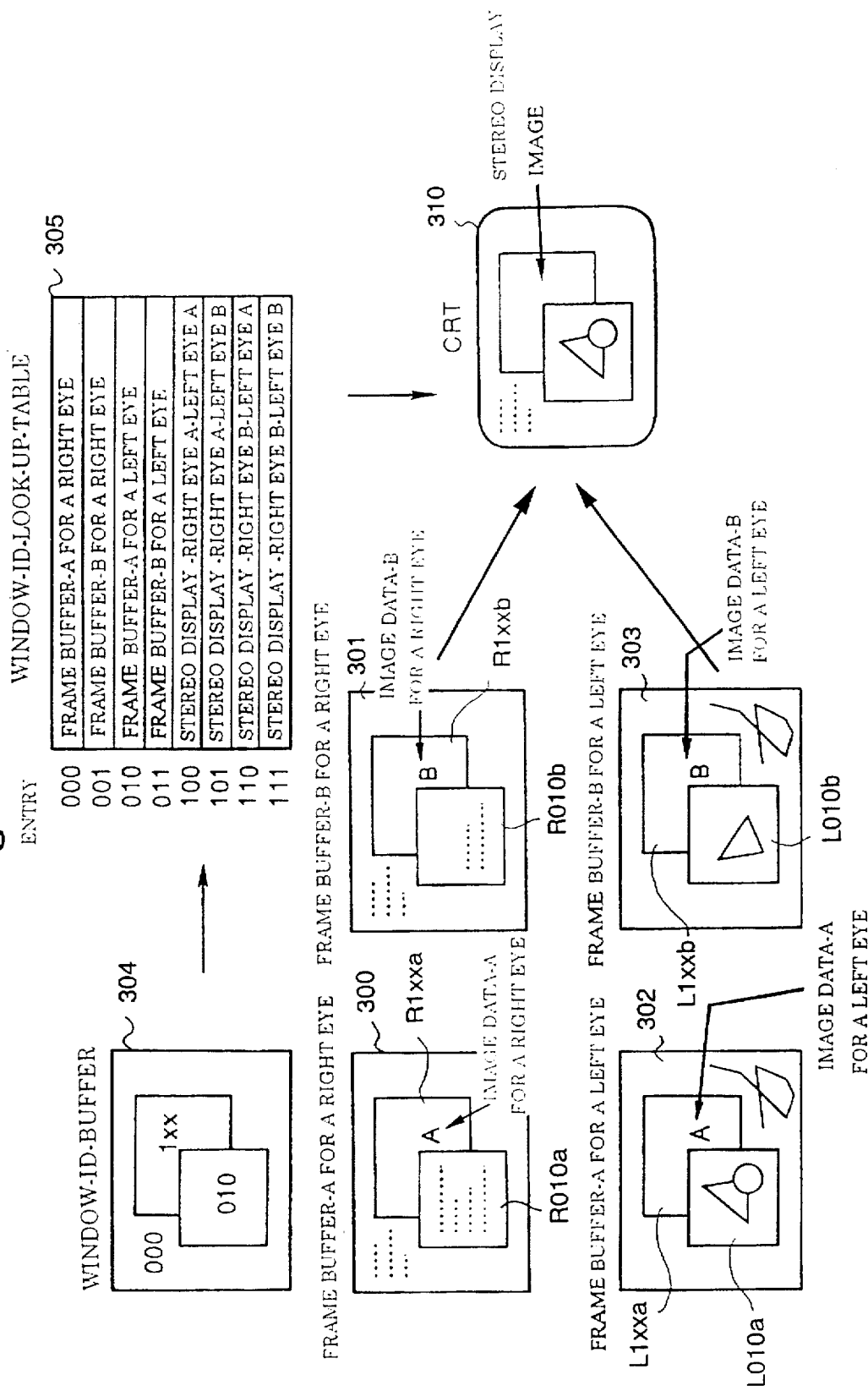
FIG. 4 is a explanatory diagram of a FIG. 3, showing the relations between a W-ID-BUF, frame buffers for a right eye, frame buffers for a left eye, and a screen on a CRT.

FIG. 3 is a block diagram that shows a configuration of a graphic display unit in the second embodiment, and FIG. 4 is a explanatory drawing that illustrates the relationships between W-ID-BUF, frame buffers A and B for a right eye, frame buffers A and B for a left eye, and a CRT unit.

In FIG. 3, reference numerals 300 and 301 are respectively frame buffer A and frame buffer B that construct a double-buffer in which image data for a right eye is stored. Likewise, 302 and 303 means frame buffer A and frame buffer B for a left eye.

304 is a W-ID-BUF, where W-ID is stored corresponding to the contour of the WINDOW in order to specify some properties relative to stereo display stored in a W-ID-LUT on a pixel unit basis.

305 is a W-ID-LUT which transforms a signal for selecting a frame buffer in order to implement stereo display based on information issued from the W-ID-BUF 304.

306 is a frame counter which counts the number of frames and issues a toggled-signal representing the timing of changing the frame buffers alternatively.

307a is a selector circuit which selects image data issued from frame buffer A 300 or frame buffer B 301. 307b is a selector circuit which selects image data issued from frame buffer A 302 or B 303. 307c is a selector circuit which selects image data issued from selector 307a or selector 307b.

308 is a stereo display control circuit, which generates a signal for switching selector circuits 307a, 307b, 307c based on signals derived from information both from W-ID-LUT 305 and from a frame counter 306.

309 is a RAMDAC that transforms digital data to analog data. 310 is a CRT unit. 311 is a stereo viewer that controls shuttering a right eye and a left eye by signals outputted from a stereo display control circuit 308.

FIG. 4 shows image data for a right eye corresponding to W-ID "010" stored in a W-ID-BUF 304 is composed of frame buffers R010a and R010b. Likewise, image data for a left eye is made up of frame buffer L010a and L010b.

Further, it is shown that image data for a right eye relative to W-ID "1xx", where x is "0" or "1", is composed of frame buffer R1xxa and R1xxb, and the one for a left eye is constructed from L1xxa and L1xxb.

Also, in the W-ID-LUT 305, stereo display information related to W-ID "010" designates a frame buffer A for a left eye L010a to be displayed, and related to W-ID "1xx" designates stereo display operation by combinations of double-buffers for each eye respectively.

A description will now be given of operation.

It is assumed that three-dimensional image data suitable for a right eye be stored in a right eye frame buffers 300 and 301, and three-dimensional image data suitable for a left eye be stored in a left eye frame buffers 302 and 303.

Either frame buffer 300 or 301 is used for the purpose of drawing image data for a right eye, and the other is used for displaying image data for a right eye on a CRT, and the selection of these buffers are done by a selector circuit 307a. After the drawing operation is over, the frame buffers used for drawing and displaying are exchanged so as to prevent animation-movement from being disturbed.

Likewise, either frame buffer 302 or 303 is used for drawing and the other is used for displaying, and the selection of these frame buffers are done by a selector circuit 307b.

Which one of these image data selected by selector circuit 307a and 307b is chosen further by selector circuit 307c, and is sent to a CRT 310 after being transformed to an analog RGB signal by a RAMDAC 309.

Next, it will be explained as to how the selector circuits 307a, 307b, 307c select image data for a right eye and for a left eye.

The W-ID information that specifies the stereo display information in a W-ID-LUT 305, which corresponds to the window region of implementing stereo display, is stored in a W-ID-BUF 304.

Accordingly, this enables the region of implementing stereo display to be designated on a pixel unit basis.

The W-ID data issued from W-ID-BUF 304 is used as an index value to the W-ID-LUT 305, and W-ID-LUT information is outputted to a stereo display control circuit 308 so as to control the frame buffers.

From now on, the operation of the above configuration will be described more in detail.

In case that the table value of W-ID-LUT 305 is "stereo display—RIGHT EYE A", or "stereo display—RIGHT EYE B", then a stereo display control circuit 308 sends a signal to a selector circuit 307a so that image data from a frame buffer for a right eye A 300 or B 301 can be chosen.

Also, supposing that table value is "stereo display—LEFT EYE A", or "stereo display—LEFT EYE B", a stereo display control circuit 308 generates a signal so that image data from a frame buffer A 302 or B 303 can be chosen.

Here, it is assumed that image data stored on a right frame buffer A 300 and a left frame buffer A 302 is displayed on the WINDOW that corresponds to W-ID "1XX" on the W-ID-BUF 304. At this time, on the WINDOW="1XX", W-ID value "100" is stored as an index value to the W-ID-LUT 305.

In making use of this period, for example, image data for a right eye for the next scene can be written into the right frame buffer B 301. And after this drawing operation being through, the frame buffer for a right eye is switched from a frame buffer A 300 to a frame buffer B 301.

That is to say, the W-ID value "110", which is used as an index value to the W-ID-LUT 305, is stored on the WINDOW="1XX" of W-ID-BUF 304.

In this way, the buffers for a right eye and for a left eye which is configured as double-buffered can be switched to achieve an animation.

Also, when the toggled-signal issued from a frame counter 306 is "0", then the stereo display control circuit 308 sends a signal by which image data for a right eye issued from a selector circuit 307a should be chosen to a selector circuit 307c.

Likewise, supposing that a toggled-signal is "1", it is sent to a selector circuit 307c such a signal that image data for a left eye outputted from a selector circuit 307b should be chosen.

A frame counter 306 is a programmable counter that counts up by VSC signal and outputs the toggled-signal to a stereo display control circuit 308 synchronized with the VSC signal. The switching operation of the toggled-signal is done during a vertical blanking period.

Further, while image data from a frame buffer for a right eye 300 or 301 is being displayed, a stereo display control circuit 308 closes a shutter for a left eye on a stereo viewer 311. On the other hand, while image data from a frame buffer for a left eye 302 or 303 being displayed, a stereo display control circuit 308 closes a shutter for a right eye.

In this way, with regard to image data specified as stereo display, while the image data on the frame buffer 300 or 301 being displayed on the screen, it can be seen through a right eye, and image data on a frame buffer 302 or 303 being displayed, it can be seen through a left eye.

Further, as well as the operation that the display and drawing is performed by using different buffers, it ensures stereo display suitable for animation that the switching operation of the buffers for the display and for drawing is done after the drawing operation is over.

Embodiment 3

The third embodiment of the present invention will be described in the following according to FIG. 5 and FIG. 6.

Figure 5:
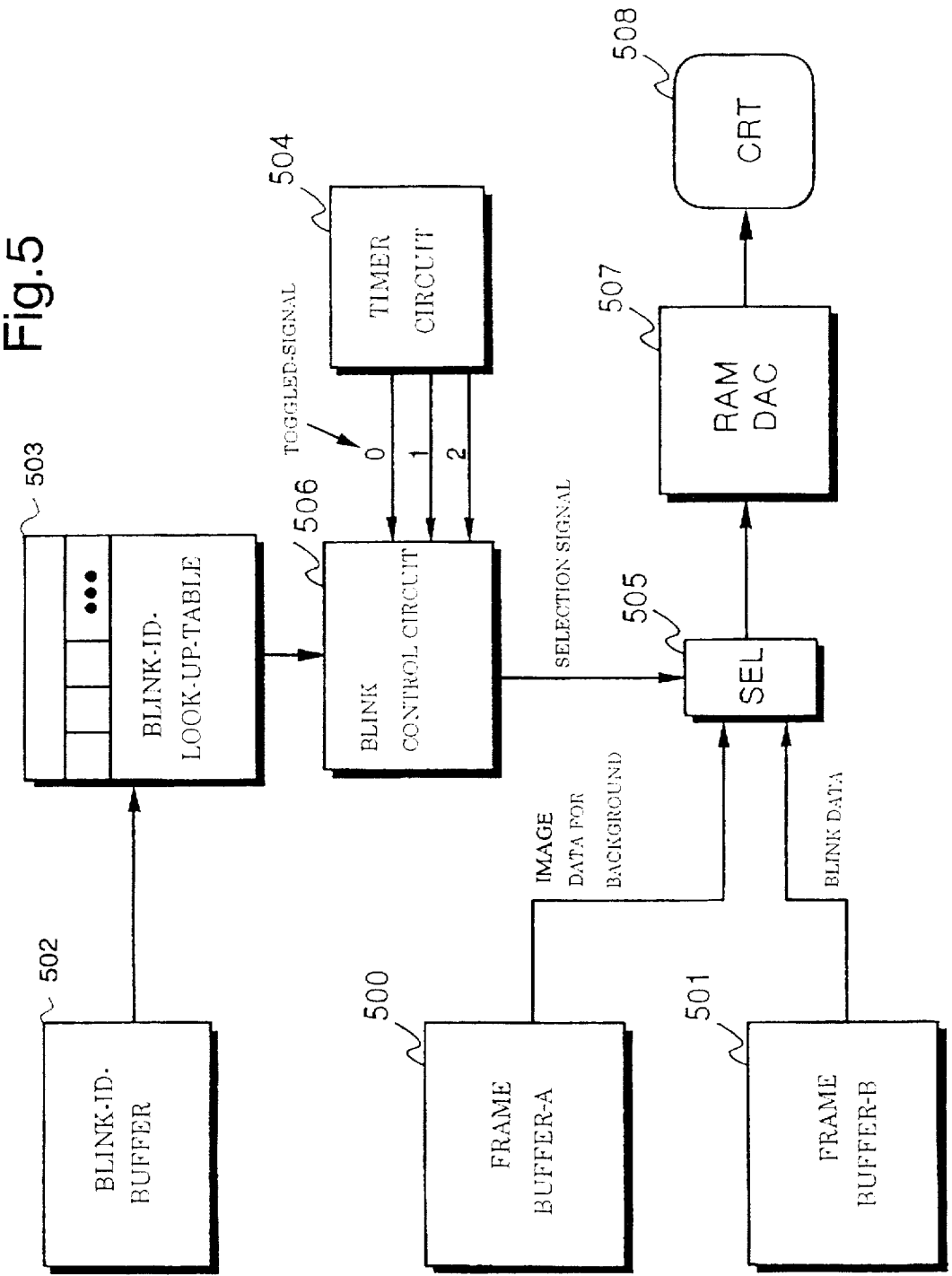
FIG. 5 is a block diagram of a graphic display unit according to a third embodiment of the present invention.
Figure 6:
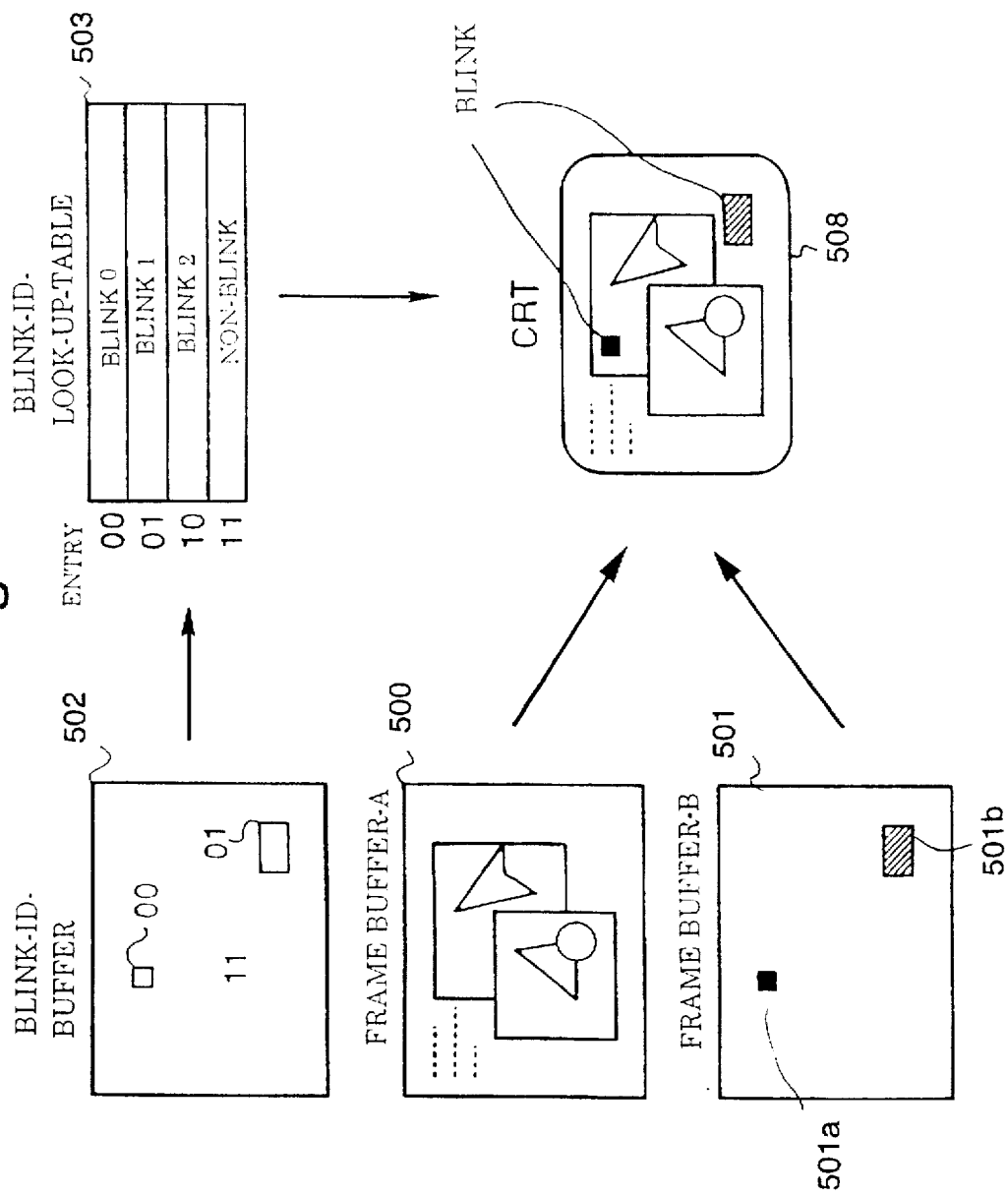
FIG. 6 is an explanatory diagram of a FIG. 5, showing the relations between a BLINK-ID-BUF, frame buffer A, frame buffer B and a screen on a CRT.
Figure 7:
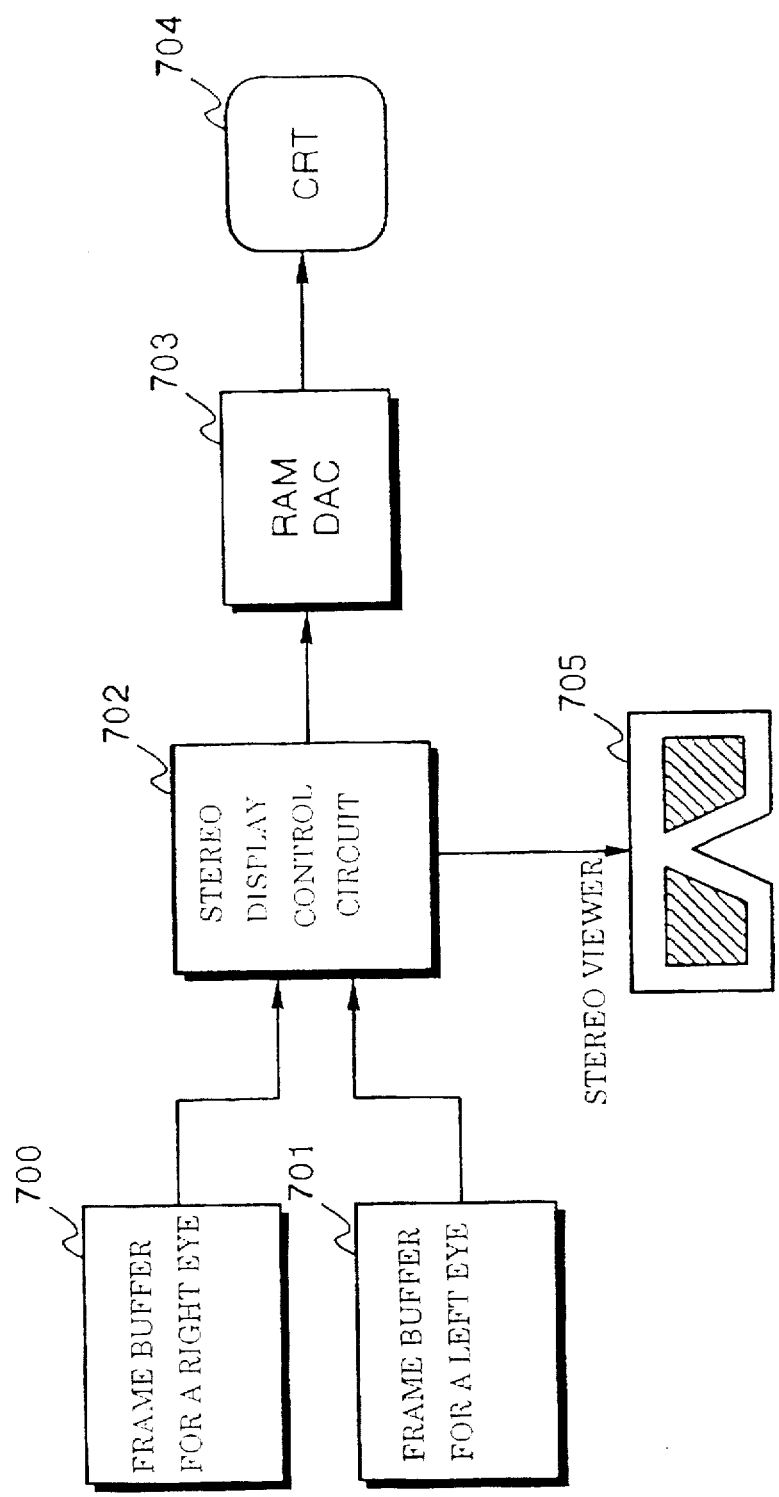
FIG. 7 is a block diagram of a conventional stereo display unit.

FIG. 5 is a block diagram that shows a configuration of the graphic display unit of a third embodiment, and FIG. 6 is an explanatory drawing that illustrates that relationship between a blink-id buffer, a frame buffer A, a frame buffer B and a screen on a CRT unit.

In FIG. 5, reference numeral 500 is a frame buffer A for storing image data, 501 is a frame buffer B for storing color information for performing a blink operation.

502 is a Blink-ID- Buffer (referred to as "B-ID-BUF" hereinafter), in which there is stored B-ID-information (referred to as "B-ID-INF" hereinafter) used to specify an index value to a Blink-Id-Look-Up-Table 503 (referred to as B-ID-LUT hereinafter).

There is stored information of controlling a blink operation in the B-ID-LUT 503. Also, 504 is a timer circuit that determines a blink period. 505 is a selector circuit which selects pixel data issued from frame buffer A 500 or frame buffer B 501.

506 is a blink control circuit that outputs a switching signal to the selector circuit 505 based on signals both from the information of B-ID-LUT 503 and from timer circuit 504. 507 is a RAMDAC for transforming digital data to analog data, and 508 is a CRT unit.

In FIG. 6, the regions subject to blink operation and the color in blinking are specified at portions 501a and 501b within a frame buffer B 501.

And on the B-ID-BUF 502, the B-ID value "00" and "01" used as an index to the B-ID-LUT 503 is stored corresponding to the said portion.

In the B-ID-LUT 503 specified by the index value "00", there is stored information related to period controlled by "BLINK0". Likewise, in the entry "01", the information controlled by "BLINK1" is registered.

A description will now be given as to how a graphic display unit accomplishes blink operation.

It is assumed that image data for background is stored in a frame buffer A 500 and there is stored color data on a pixel unit basis on a frame buffer B 501, in advance.

After a selector circuit 505 selects either pixel data from a frame buffer A 500 or from a frame buffer B 501, such pixel data is transformed into an analog RGB signal by a RAMDAC 507 to be displayed on the CRT unit 508.

Next the explanation will be given as to how a selector circuit 505 selects the pixel data that is issued from a frame buffer A 500 and B 501 and displays one on the CRT unit.

A B-ID-BUF 502 is the same size as that of a frame buffer A or B in vertical and horizontal, in which the blink ID is written at the portion corresponding to the pixels for a blinking operation. This enables the region of blinking operation to be specified on a pixel basis unit.

And B-ID-data read out from B-ID-BUF 502 is used as an index value to the B-ID-LUT 503, and such information in the B-ID-LUT as specified by said B-ID-BUF is transformed into the control information of selecting a frame buffer A or a frame buffer B.

Here, a description will be given in more detail of the operation with respect to accompanying FIG. 6.

In the region where value "11" is stored on the B-ID-BUF 502, since the contents of the B-ID-LUT 503 specified by index value "11" means "NON-BLINK", the blink control circuit 506 outputs a signal so that a frame buffer A used for background data can be chosen to the selector circuit 505.

On the other hand, in the region where the value "00" is stored on the B-ID-BUF, because the entry value specifies "BLINK0", the blink control circuit 506 outputs a signal to the selector circuit 505 so that frame buffer A 500 can be chosen when a toggled-signal of "0" is outputted from a timer circuit 504.

On the other hand, when the toggled-signal is "1", a signal to select a frame buffer B 501 is issued to the selector circuit 505.

The timer circuit 504 is a programmable counter that uses a VSC signal as a clock and outputs a toggled-signal to the blink control circuit 506 on account of ON-OFF control of the blink operation. The switching operation of the toggled-signal is performed during a vertical blanking period.

In this way, supposing that the B-ID value on the B-ID-BUF 502 is defined as "BLINK0" by the B-ID-LUT 503, then the pixel data in the frame buffer A 500 and frame buffer B 501 are alternately selected based on the toggled-signal "0". As a result, this enables pixel data for background or for blink operation on each frame buffer to be displayed alternately and periodically.

Likewise, in case that the B-ID value is determined to be the "BLINK1" or "BLINK2" by the B-ID-LUT 503, the ON-OFF control for blink operation is subject to other toggled-signals caused by a timer circuit 504.

According to the present invention, since the graphic display unit is implemented in such way as to identify the region subject to stereo display on a pixel by pixel basis, and switches the buffers for a right eye and a left eye, so this system ensures stereo display on the region with an arbitrary contour.

Also, this graphic display unit ensures stereo display smoothly on a spliced region basis since buffers for a right eye and a left eye are implemented as a double-buffered configuration respectively.

Also, according to the present invention, since the graphic display unit is implemented in such way as to identify the region subject to a blink operation on a pixel by pixel basis, and switches the buffers for background and for blink control alternatively, so this display unit ensures the blink operation on the region with an arbitrary contour.

Further, according to the present invention, since frame buffers both for a right eye and for a left eye have a double-buffered configuration switched from one to the other for the purpose of a drawing and displaying operation, this display unit ensures the stereo display suitable for animation or like that.

Moreover, according to the present invention, since the graphic display unit is implemented in the way that identifies the region subject to a blink operation, and registers a different period information and switches between the buffers for background and the buffers for blink control, so this display unit ensures the blink operation controlled by an arbitrary region with the contour and a different periodicity.

Having described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and equivalents.

What is claim is:

1. A graphic display unit for implementing display of data from a plurality of frame buffers in a plurality of independent window regions to be viewed through a stereo viewer comprising:

a first frame buffer for storing first image data;
    a second frame buffer for storing second image data;
    storing means for storing window display properties corresponding to each independent window region;
    a selector circuit which performs a switching operation between said first frame buffer and said second frame buffer to enable one of said first image data and said second image data to be displayed in each independent window region; and
    a stereo display control circuit which receives as inputs said window display properties and a timing signal, and which synchronizes said switching operation of said selector circuit with a shutter operation for a right eye and a left eye of said stereo viewer, based on said window display properties and said timing signal, by outputting a first control signal to said selector circuit and a second control signal to said stereo viewer.

2. The graphic display unit of claim 1, wherein said storing means comprises:

a window-id look-up-table for storing information defining frame buffer selection for display corresponding to each independent window region; and
    a window-id buffer that stores a plurality of indices to said window-id look-up-table, each index corresponding to one of said plurality of independent window regions.

3. The graphic display unit of claim 2, wherein:

said information stored in said window-id look-up-table associates each independent window region with one of said first frame buffer, said second frame buffer, and a combination of said first frame buffer and said second frame buffer; and
    said control signals to said selector circuit enable the display of said first image data within each independent window region associated with said first frame buffer, the display of said second image data within each independent window region associated with said second frame buffer, and the alternate display of said first image data and said second image data within each independent window region associated with the combination of said first frame buffer and said second frame buffer.

4. The graphic display unit of claim 3, wherein, for each independent window region associated with the combination of said first frame buffer and said second frame buffer:

the display of said first image data is enabled by said selector circuit when said timing signal is at a first logic level;
    the display of said second image data is enabled by said selector circuit when said timing signal is at a second logic level;
    said control signals to said stereo viewer close a left eye shutter on said stereo viewer when the display of said first image data is enabled by said selector circuit; and
    said control signals to said stereo viewer close a right eye shutter on said stereo viewer when the display of said second image data is enabled by said selector circuit.

5. The graphic display unit of claim 2, wherein said information stored in said window-id look-up-table associates each independent window region with one of said first frame buffer, said second frame buffer, and a combination of said first frame buffer and said second frame buffer on a pixel unit basis.

6. A graphic display unit for implementing display of data from a plurality of frame buffers in a plurality of independent window regions to be viewed through a stereo viewer comprising:

first and second frame buffers for storing first image data suitable for a right eye;
    third and fourth frame buffers for storing second image data suitable for a left eye;
    storing means for storing window display properties corresponding to each independent window region;
    a first selector circuit which performs a first switching operation between said first frame buffer and said second frame buffer to select said first image data stored in one of said first frame buffer and said second frame buffer to be a right image data output;

a second selector circuit which performs a second switching operation between said third frame buffer and said fourth frame buffer to select said second image data stored in one of said third frame buffer and said fourth frame buffer to be a left image data output;

a third selector circuit which performs a third switching operation between said right image data output and said left image data output to enable either said right image data output or said left image data output to be displayed; and a stereo display control circuit which receives as inputs said window display properties and a timing signal, and which synchronizes said switching operation of said first, second and third selector circuits with a shutter operation for a right eve and a left eye of said stereo viewer, based on said window display properties and said timing signal, by outputting a first, second and third control signal to said first, second and third selector circuits, respectively, and a fourth control signal to said stereo viewer.

7. The graphic display unit of claim 6, wherein said storing means comprises:

a window-id look-up-table for storing information defining frame buffer selection for display corresponding to each independent window region; and a window-id buffer that stores a plurality of indices to said window-id look-up-table, each index corresponding to one of said plurality of independent window regions.

8. The graphic display unit according to claim 7, wherein:

said information stored in said window-id look-up-table associates each independent window region with one of said first frame buffer, said second frame buffer, said third frame buffer, said fourth frame buffer, and a combination of said first or second frame buffer and said third or fourth frame buffer;

said control signals to said first and third selector circuit enable the display of said first image data stored in said first frame buffer within each independent window region associated with said first frame buffer;

said control signals to said first and third selector circuit enable the display of said first image data stored in said second frame buffer within each independent window region associated with said second frame buffer;

said control signals to said second and third selector circuit enable the display of said second image data stored in said third frame buffer within each independent window region associated with said third frame buffer;

said control signals to said second and third selector switch enable the display of said second image data stored in said fourth frame buffer within each independent window region associated with said fourth frame buffer; and said control signals to said first, second and third selector switch enable the alternate display of said first image data and said second image data within each independent window region associated with the combination of said first or second frame buffer and said third or fourth frame buffer.

9. The graphic display unit of claim 8, wherein, for each independent window region associated with the combination of said first or second frame buffer and said third or fourth frame buffer:

the display of said first image data is enabled by said first and third selector circuit when said timing signal is at a first logic level;

the display of said second image data is enabled by said second and third selector circuit when said timing signal is at a second logic level;

said control signals to said stereo viewer close a left eye shutter on said stereo viewer when the display of said first image data is enabled by said first and third selector circuit; and said control signals to said stereo viewer close a right eye shutter on said stereo viewer when the display of said second image data is enabled by said second and third selector circuit.

10. The graphic display unit of claim 7, wherein said information stored in said window-id look-up-table associates each independent window region with one of said first frame buffer, said second frame buffer, said third frame buffer, said fourth frame buffer, and a combination of said first or second frame buffer and said third or fourth frame buffer on a pixel unit basis.

11. A graphic display unit for implementing a plurality of independent blink operations comprising:

a first frame buffer for storing background image data;

a second frame buffer for storing blink image data comprising color information for blinking and a region of a display subject to each independent blink operation;

storing means for storing blink properties corresponding to each independent blink operation;

a selector circuit which performs a switching operation between said first frame buffer and said second frame buffer to enable one of said background image data and said blink image data to be displayed; and a blink control circuit which receives as inputs said blink properties and a plurality of timing signals, and which operates said selector circuit, based on said blink properties and said plurality of timing signals, by outputting a control signal to said selector circuit.

12. The graphic display unit of claim 11, wherein said storing means comprises:

a blink-id look-up-table for storing blink information defining selection of one of said plurality of timing signals corresponding to each independent blink operation; and a blink-id buffer that stores a plurality of indices to said blink-id look-up-table, each index corresponding to one of said plurality of independent blinking operations.

13. The graphic display unit of claim 12, wherein:

said information stored in said blink-id look-up-table associates each independent blink operation with one of said plurality of timing signals, each timing signal having a unique period;

said blink control circuit selects one of said plurality of timing signals associated with each independent blink operation as a blink timing signal;

said control signal to said selector circuit enables the display of said background image data when said blink timing signal is at a first logic level; and said control signal to said selector circuit enables the display of said blink image data when said blink timing signal is at a second logic level.

14. A method for display through a stereo viewer comprising the steps of:

storing right eye image data;

storing left eye image data;

storing window characteristics defining each of a plurality of window areas on a display, as one of said right eye image data, said left eye image data, and a combination of said right eye image data and said left eye image data; and controlling a selector switch which enables the display of said right eye image data within each window area associated with said right eye image data, the display of said left eye image data within each window area associated with said left eye image data, and the alternate display of said right eye image data and said left eye image data within window areas associated with the combination of said right eye image data and said left eye image data.

15. The method of claim 14, further comprising the steps of:

closing a left eye shutter on the stereo viewer when said right eye image data is displayed within window areas associated with the combination of said right eye image data and said left eye image data; and closing a right eye shutter on the stereo viewer when said left eye image data is displayed within window areas associated with the combination of said right eye image data and said left eye image data.

16. The method of claim 14, wherein:

said step of storing said right eye image data includes storing first right eye image data and second right eye image data;

said step of storing said left eye image data includes storing first left eye image data and second left eye image data; and said step of storing window characteristics defines each window area as one of said first right eye image data, said second right eye image data, said first left eye image data, said second left eye image data, and a combination of said first or second right eye image data and said first or second left eye image data.

17. The method of claim 16, further comprising the steps of:

controlling a first switch which selects one of said first right eye image data and said second right eye image data to be said right eye image data, depending on said window characteristics;

controlling a second switch which selects one of said first left eye image data and said second left eye image data to be the left eye image data, depending on said window characteristics;

closing a left eye shutter on the stereo viewer when said right eye image data is displayed within window areas associated with the combination of said right eye image data and said left eye image data; and closing a right eye shutter on the stereo viewer when said left eye image data is displayed within window areas associated with the combination of said right eye image data and said left eye image data.

18. A method for display of a plurality of independent blinking images comprising the steps of:

storing background image data;

storing blink image data comprising color information and a region of a display for each of said independent blinking images;

storing blink control information which associates each of a plurality of timing signals with each of said independent blinking images; and controlling a selector switch based on said blink control information and said timing signals which enables the display of said background image data or said blink image data for each of said independent blinking images.

* * * * *

UNITED STATES PATENT AND TRADEMARK OFFICE
CERTIFICATE OF CORRECTION

PATENT NO. : 5,801,705

DATED : September 1, 1998

INVENTOR(S) : Yoshiyuki Kato, Masatoshi Kameyama and Takahiro Miki

It is certified that error appears in the above-identified patent and that said Letters Patent is hereby corrected as shown below:

Title page, Item [73] please change "Mitsudishi" to -- Mitsubishi --.

Signed and Sealed this

First Day of December, 1998

*Attest:*

BRUCE LEHMAN

*Attesting Officer*     Commissioner of Patents and Trademarks